(12) United States Patent
Morgan et al.

(10) Patent No.: US 7,000,860 B1
(45) Date of Patent: Feb. 21, 2006

(54) TAPE CARTRIDGE

(75) Inventors: Phillip M. Morgan, Berthoud, CO (US); William J. Vanderheyden, Loveland, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/746,090

(22) Filed: Dec. 26, 2003

Related U.S. Application Data

(63) Continuation-in-part of application No. 10/670,919, filed on Sep. 25, 2003.

(51) Int. Cl.
*G11B 15/66* (2006.01)

(52) U.S. Cl. .................... 242/332.4; 360/132

(58) Field of Classification Search ............. 242/332.4, 242/332.1, 348; 360/132
See application file for complete search history.

(56) References Cited

U.S. PATENT DOCUMENTS

| | | | | |
|---|---|---|---|---|
| 3,293,682 | A | * | 12/1966 | Giles ........................ 242/332.4 |
| 3,594,512 | A | * | 7/1971 | Castagna .................. 242/332.4 |
| 3,764,088 | A | * | 10/1973 | Yamada et al. |
| 3,807,652 | A | * | 4/1974 | Kruhn et al. ................ 242/332 |
| 3,980,254 | A | * | 9/1976 | Coon et al. .............. 242/348.2 |
| 4,045,821 | A | * | 8/1977 | Fujikura ..................... 360/132 |
| 4,556,923 | A | | 12/1985 | Olmsted |
| 4,572,460 | A | | 2/1986 | Hertrich |
| 4,586,095 | A | | 4/1986 | Olmsted |
| 5,237,469 | A | | 8/1993 | Kukreja et al. |
| 5,297,755 | A | | 3/1994 | Felde et al. |
| 5,332,173 | A | * | 7/1994 | Kubota et al. ............ 242/332.4 |
| 5,492,284 | A | * | 2/1996 | Sorensen .................. 242/348.2 |
| 5,557,484 | A | * | 9/1996 | Leonhardt et al. ........ 242/332.4 |
| 5,610,789 | A | | 3/1997 | Miller |
| 5,660,345 | A | | 8/1997 | Buckland et al. |
| 5,868,333 | A | | 2/1999 | Nayak |
| 6,003,802 | A | | 12/1999 | Eaton et al. |
| 6,433,953 | B1 | * | 8/2002 | Taki et al. ................ 242/332.4 |
| 6,445,539 | B1 | | 9/2002 | Morita et al. |
| 6,488,223 | B1 | | 12/2002 | Hayashi |
| 6,565,028 | B1 | | 5/2003 | Sasaki et al. |
| 6,581,865 | B1 | | 6/2003 | Zweighaft et al. |
| 6,742,738 | B1 | | 6/2004 | Hiraguchi |
| 2001/0035470 | A1 | * | 11/2001 | Mizutani et al. ......... 242/332.4 |
| 2003/0209623 | A1 | | 11/2003 | Hoge |

* cited by examiner

*Primary Examiner*—William A. Rivera
(74) *Attorney, Agent, or Firm*—Brooks Kushman P.C.

(57) ABSTRACT

A tape cartridge, for use with a tape drive having a threading mechanism, includes a magnetic tape, a leader attached to an end of the tape and configured to engage the threading mechanism, and a cartridge body for housing the tape. The cartridge body includes first and second faces disposed at an angle to each other. The first face has a first opening through which the leader and tape may travel, and the second face has a second opening for receiving the threading mechanism of the tape drive.

24 Claims, 3 Drawing Sheets

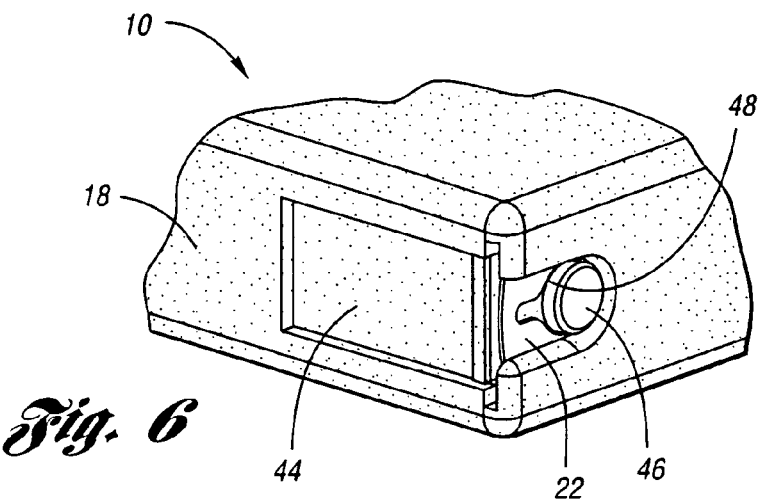
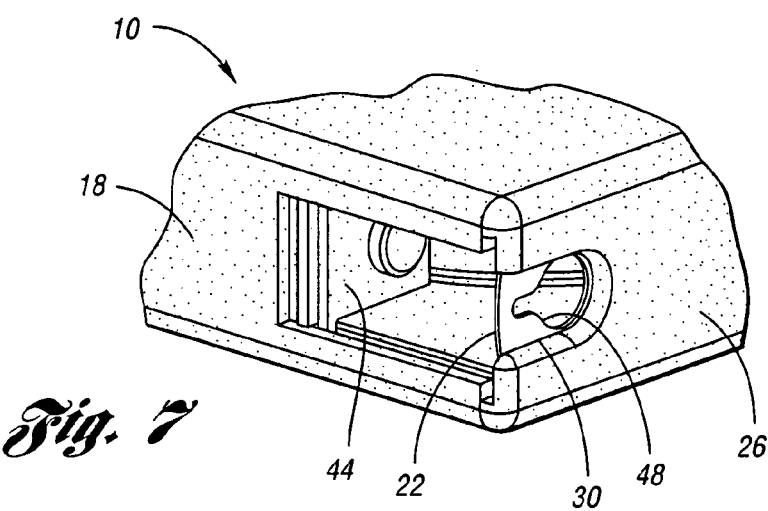
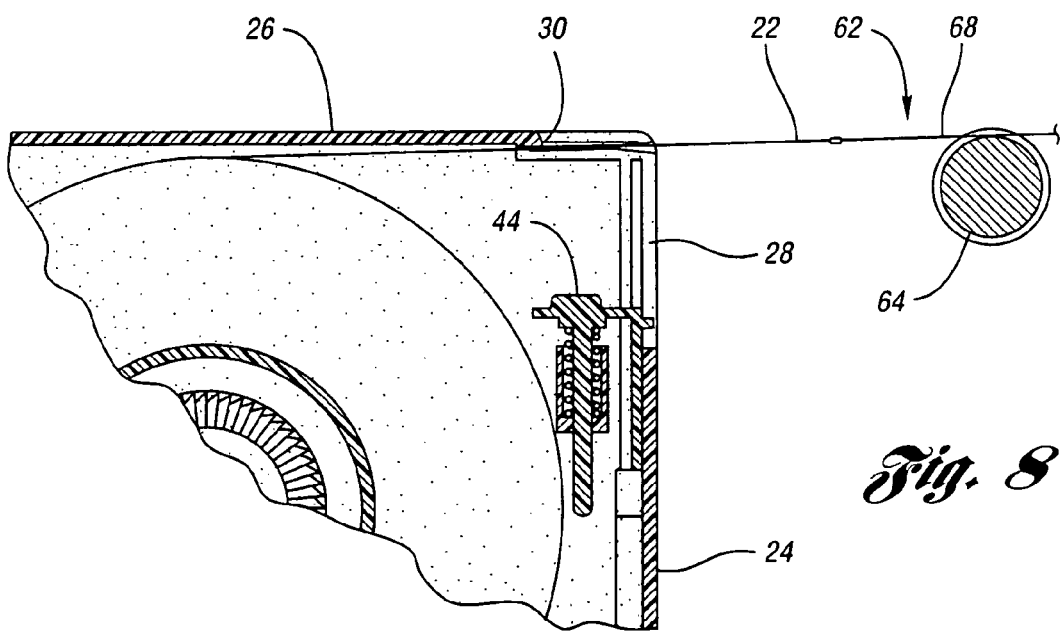

TAPE CARTRIDGE

CROSS-REFERENCE TO RELATED APPLICATIONS

This application is a continuation-in-part of U.S. application Ser. No. 10/670,919 filed Sep. 25, 2003, entitled "Tape Cartridge Media Access Door."

BACKGROUND OF THE INVENTION

1. Field of the Invention

The invention relates to a tape cartridge for use with a tape drive.

2. Background Art

A tape cartridge typically includes magnetic tape wound on a supply reel. Data is read from or written to the tape by inserting the cartridge into a tape drive that includes a read/write head. The cartridge may also include an access door to protect the tape from damage. When the cartridge is inserted into the drive, the door is opened to provide access to a leader attached to an end of the tape.

SUMMARY OF THE INVENTION

Under the invention, a tape cartridge for use with a tape drive having a threading mechanism is provided. The tape cartridge includes a magnetic tape, a leader attached to an end of the tape and configured to engage the threading mechanism, and a cartridge body for housing the tape. The cartridge body includes first and second faces disposed at an angle to each other. The first face has a first opening through which the tape may travel, and the second face has a second opening for receiving the threading mechanism of the tape drive.

Further under the invention, a tape cartridge for use with a tape drive including a threading mechanism and a tape path having a first guide element is provided. The cartridge includes a supply reel, a magnetic tape wound on the supply reel, and a leader attached to an end of the tape. The leader includes a head having an aperture for receiving the threading mechanism of the tape drive. In addition, the cartridge includes a cartridge body supporting the supply reel and including first and second adjacent faces that are generally perpendicular to each other. The first face has a first opening through which the tape may travel, and the second face has a second opening for receiving the threading mechanism of the tape drive. The cartridge body further has a channel for stowing the leader in a stowed position and a stop that engages the head of the leader when the leader is in the stowed position. The channel extends at an angle with respect to the second face such that the channel is generally aligned with the first guide element of the tape drive when the cartridge body is inserted into the tape drive.

A method according to the invention for accessing a leader of a tape cartridge includes the steps of inserting the cartridge into a tape drive having a threading mechanism, the cartridge having first and second faces disposed at an angle to each other, the first face at least partially defining a first opening and the second face having a second opening; inserting the threading mechanism through the second opening to engage the leader of the cartridge; and pulling the leader through the first opening.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 6 is an enlarged, fragmentary view of the cartridge showing the leader in the stowed position and a door of the cartridge in a closed position;

FIG. 7 is an enlarged, fragmentary view of the cartridge showing the leader in the stowed position and the door in an open position; and FIG. 8 is a fragmentary plan view of the cartridge and the drive showing a machine leader of the tape drive engaged with the leader of the cartridge.

DETAILED DESCRIPTION OF THE PREFERRED EMBODIMENT(S)

Figure 1:
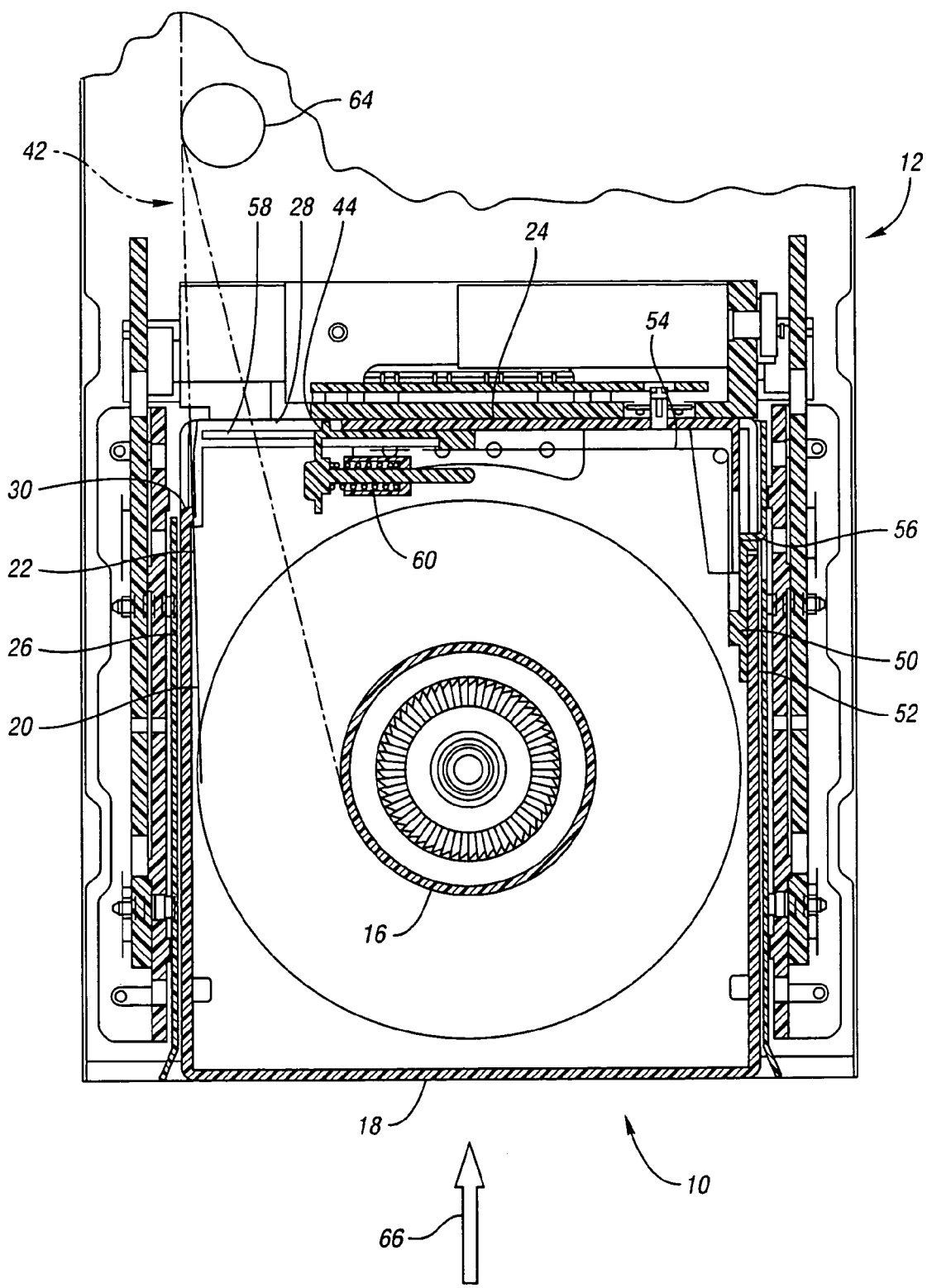
FIG. 1 is a fragmentary plan view of a system according to the invention including a tape cartridge inserted into a tape drive.

FIG. 1 shows a tape cartridge 10 according to the invention for use with a tape drive 12. The cartridge 10 includes a supply reel 16 rotatably mounted on a cartridge body 18, such that the supply reel 16 is free to rotate within the cartridge body is when cartridge 10 is inserted into the tape drive 12. A length of magnetic tape 20 is wound on the supply reel 16, and a leader 22 is attached to a free end of the tape 20.

Figure 2:
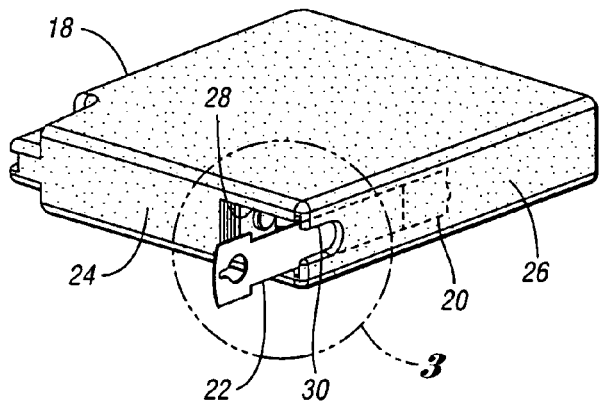
FIG. 2 is a front perspective view of the cartridge showing a leader of the cartridge pulled partially from a cartridge body.
Figure 3:
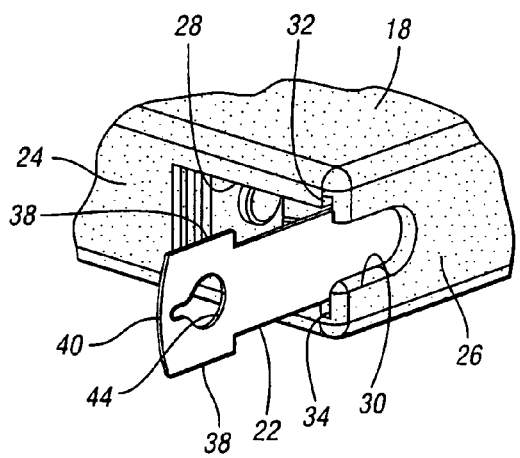
FIG. 3 is an enlarged, fragmentary view of a portion of the cartridge of FIG. 2.

Referring to FIGS. 1–3, the cartridge body 18 supports the supply reel 16 and is configured to be inserted into the tape drive 12. The cartridge body 18 includes first and second adjacent surfaces or faces 24 and 26, respectively, that extend at an angle to each other. In the embodiment shown in FIGS. 1–3, for example, the first face 24 is generally perpendicular to the second face 26. The first face 24 at least partially defines a first opening 28 through which the tape 20 and leader 22 may travel. The second face 26 has a second opening 30 for allowing access to the leader 22, as explained below in detail.

Figure 4:
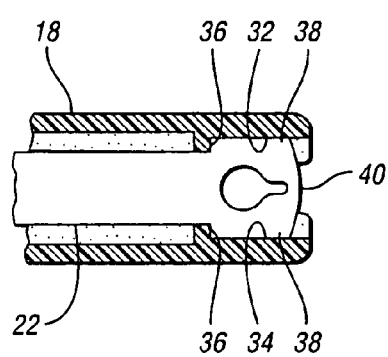
FIG. 4 is a side cross-sectional view of the cartridge showing the leader in a stowed position.

Referring to FIGS. 3 and 4, the cartridge body 18 further includes first and second channels or slots 32 and 34, respectively, for receiving first and second edges of the leader 22. More specifically, the slots 32 and 34 are configured to stow the leader 22 in a stowed position shown in FIG. 4. Each slot 32 and 34 also has a first end that terminates at a stop 36, and each stop 36 engages a tab 38 formed on an enlarged head 40 of the leader 22 when the leader is in the stowed position. In addition, each slot 32 and 34 has a second end that forms part of the first opening 28.

Figure 5:
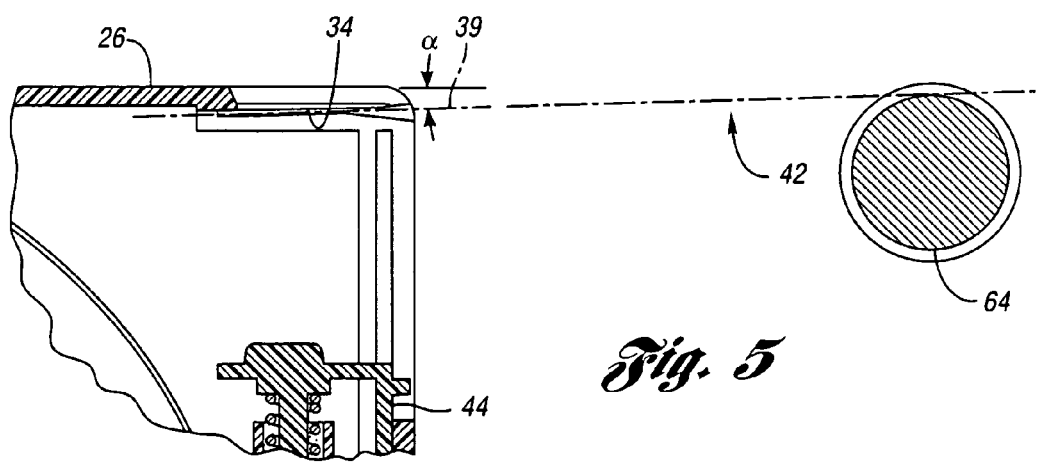
FIG. 5 is a fragmentary plan view of the cartridge and tape drive showing an angled slot formed in the cartridge body for stowing the leader.

Referring to FIG. 5, each slot 32 and 34 is generally straight and extends at an angle with respect to the second face 26 to facilitate extraction and insertion of the leader 22, as explained below in detail. Although only the second slot 34 is shown in FIG. 5, the first slot 32 may extend in the same manner such that both slots 32 and 34 are not parallel to the second face 26.

More specifically, each slot 32 and 34 has a main or central axis 39 that extends at an angle α with respect to the second face 26, such that the slots 32 and 34 are generally aligned with a tape path 42 of the tape drive 12 when the cartridge 10 is inserted into the tape drive 12. While the angle α may be any suitable angle such that the slots 32 and 34 are generally aligned with the tape path 42, such as an angle in the range of negative ten to positive ten degrees, in one embodiment of the invention angle α may be in the range of two to four degrees or negative two to negative four degrees. Referring to FIG. 5, a positive value for angle α indicates that the slots 32 and 34 are rotated counterclockwise with respect to the second face 26 (as shown in FIG. 5), while a negative value for angle α indicates that the slots 32 and 34 are rotated clockwise with respect to the second face 26.

In the embodiment shown in FIG. 5, the axis 39 is not perpendicular to the first face 24. For example, the axis 39 may extend at an angle greater than or less than ninety degrees with respect to the first face 24.

Referring to FIGS. 6 and 7, the cartridge 10 further includes a door 44 movably associated with the cartridge body 18. The door 44 is movable between a closed position, shown in FIG. 6, and an open position, shown in FIG. 7, for allowing extraction of the leader 22. The door 44 may be provided with a boss or projection 46 that extends into an aperture 48 formed in the leader 22 when the door 44 is in the closed position. With such a configuration, the door 44 assists in holding the leader 22 in the stowed position.

While the cartridge 10 and/or tape drive 12 may be provided with any suitable mechanism for opening the door 44, in the embodiment shown in FIG. 1, the cartridge 10 includes a slider 50 slidably mounted on a side 52 of the cartridge body 18, and connected to the door 44 with a flexible member 54, such as a belt. When the cartridge 10 is inserted into the tape drive 12, the slider 50 engages a tab 56 of the tape drive 12. As a result, the slider 50 slides along the side 52, thereby pulling the door 44 along groove 58 toward the open position. A spring 60 may also be connected between the door 44 and the cartridge body 18 for urging the door toward the closed position. Additional details regarding this door opening mechanism are disclosed in co-pending application Ser. No. 10/670,919, which is hereby incorporated by reference in its entirety. Alternatively, the door 44 may be configured to open in any suitable manner.

Referring to FIGS. 1 and 8, the tape drive 12 is configured to receive the cartridge 10 and to perform read and/or write operations on the tape 20. For example, the tape drive 12 may include a threading mechanism 62, such as a buckling mechanism, for engaging the leader 22 and for routing the leader 22 and tape 20 along the tape path 42 to a take-up reel (not shown). The tape drive 12 includes one or more guide elements 64, such as rollers, posts and/or air bearings, that cooperate to define the tape path 42 and function to guide the leader 22 and tape 20 to the take-up reel. Once the leader 22 is loaded onto the take-up reel, the tape drive 12 may then function to route the tape 20 across one or more read and/or write heads (not shown) for performing read and/or write operations on the tape 20.

Operation of the cartridge 10 and tape drive 12 will now be described. First, referring to FIG. 1, the cartridge 10 may be inserted into the tape drive 12, either manually or automatically. For example, the cartridge 10 may be inserted into the tape drive 12 in a first direction 66 generally perpendicular to the first face 24. Prior to or as a result of insertion of the cartridge 10 into the tape drive 12, the door 44 may be opened such as in the manner described above in detail.

Once the door 44 is moved to the open position, the threading mechanism 62 of the tape drive 12 may engage the leader 22 and route the leader 22 and tape 20 to the take-up reel of the tape drive 12. For example, referring to FIGS. 7 and 8, the threading mechanism 62 may include a machine leader 68 that is configured to pass through the second opening 30 formed in the second face 26, and buckle to the leader 22 at aperture 48. After connecting to the leader 22, the threading mechanism 62 may pull the leader 22 through the first opening 28 to route the leader 22 to a first one of the guide elements 64, and then along the remainder of tape path 42 to the take-up reel. Read and/or write operations may then be performed on the tape 20.

Advantageously, because the slots 32 and 34 are aligned with the tape path 42, and in particular the first guide element 64, the leader 22 is aligned with the first guide element 64 when the cartridge 10 is inserted into the tape drive 12. As a result, side loads on the enlarged head 40 of the leader 22 may be minimized or eliminated as the leader 22 is extracted from the cartridge body 18. Likewise, side loads on the leader 22 may be minimized or eliminated when the leader 22 is returned to the stowed position. In addition, because the leader 22 may be stowed in the slots 32 and 34 without any latching devices, and because the leader 22 is extracted and inserted in a direction generally parallel with slots 32 and 34, extraction and insertion forces may be minimized.

Furthermore, the cartridge 10 is configured to provide easy access to the leader 22. For example, threading mechanism 62 may access the leader 22 through second opening 30 of the second face 26, which may be a side surface of the cartridge body 18. In addition, because the leader 22 may be extracted through first opening 28 of the first face 24, which may be a front surface of the cartridge body 18, the tape path 42 between the cartridge 10 and the take-up reel may be minimized. As a result, the overall size of the cartridge 10 and tape drive 12 may be minimized, thereby providing a compact cartridge and drive system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape cartridge for use with a tape drive having a threading mechanism, the cartridge comprising:
   a magnetic tape;
   a leader attached to an end of the tape and configured to engage the threading mechanism;
   a cartridge body for housing the tape, the cartridge body including first and second faces disposed at an angle to each other, the first face having a first opening through which the tape may travel, the second face having a second opening for receiving the threading mechanism of the tape drive; and
   a door movably associated with the cartridge body such that the door is movable between a closed position and an open position for allowing extraction of the leader, the door being configured to extend into an aperture of the leader when the door is in the closed position.

2. The cartridge of claim 1 wherein the first face is generally perpendicular to the second face.

3. The cartridge of claim 1 wherein the aperture is configured to receive the threading mechanism.

4. The cartridge of claim 1 wherein the cartridge is configured to be inserted into the tape drive in a first direction, and wherein the first face is generally perpendicular to the first direction.

5. The cartridge of claim 4 wherein the second face is generally perpendicular to the first face.

6. The cartridge of claim 1 wherein the cartridge body further has a slot for stowing the leader in a stowed position, the slot being adjacent to the second face and extending at an angle with respect to the second face.

7. The cartridge of claim 6 wherein the slot is configured to be generally aligned with a tape path of the tape drive when the cartridge body is inserted into the tape drive.

8. The cartridge of claim 6 wherein the slot extends at an angle in the range of negative ten to positive ten degrees with respect to the second face, such that the slot is not parallel to the second face.

9. The cartridge of claim 6 wherein the slot extends at an angle in the range of two to four degrees or negative two to negative four degrees with respect to the second face.

10. The cartridge of claim 6 wherein the cartridge body has an additional slot that extends at an angle with respect to the second face, the slots being configured to receive first and second edges of the leader.

11. The cartridge of claim 1 wherein the door is engageable with the leader when the door is in the closed position.

12. The cartridge of claim 1 wherein the door is slidable with respect to the cartridge body.

13. The cartridge of claim 1 wherein the door includes a projection that extends into the aperture of the leader when the door is in the closed position.

14. A tape cartridge for use with a tape drive including a threading mechanism and a tape path having a first guide element, the cartridge comprising:
    a supply reel;
    a magnetic tape wound on the supply reel;
    a leader attached to an end of the tape, the leader including a head having an aperture for receiving the threading mechanism of the tape drive; and
    a cartridge body supporting the supply reel and including first and second adjacent faces that are generally perpendicular to each other, the first face having a first opening through which the tape may travel, the second face having a second opening for receiving the threading mechanism of the tape drive, the cartridge body further having a channel for stowing the leader in a stowed position, and a stop that engages the head of the leader when the leader is in the stowed position, the channel extending at an angle with respect to the second face such that the channel is generally aligned with the first guide element of the tape drive when the cartridge body is inserted into the tape drive.

15. The cartridge of claim 14 wherein the channel has an axis that is generally tangent to the first guide element when the cartridge body is inserted into the tape drive.

16. The cartridge of claim 14 further comprising a door movably associated with the cartridge body, the door being movable between a closed position and an open position for allowing extraction of the leader, the door further extending into the aperture of the leader when the leader is in the stowed position and the door is in the closed position.

17. A method of accessing a leader of a tape cartridge, the method comprising:
    inserting the cartridge into a tape drive having a threading mechanism, the cartridge having first and second faces disposed at an angle to each other, the first face at least partially defining a first opening, and the second face having a second opening;
    inserting the threading mechanism through the second opening to engage the leader of the cartridge; and
    pulling the leader through the first opening;
    wherein the cartridge comprises a cartridge body including the first and second faces, and a door movably associated with the cartridge body, the door being movable between a closed position and an open position for allowing extraction of the leader, and wherein prior to the step of inserting the cartridge into the tape drive, the door is in the closed position and extends into an aperture of the leader.

18. The method of claim 17 wherein the cartridge is inserted into the tape drive in a first direction, and wherein the first face of the cartridge extends generally perpendicular to the first direction.

19. The method of claim 18 wherein the second face is generally perpendicular to the first face.

20. The method of claim 17 further comprising stowing the leader in a slot formed in the cartridge, the slot extending at an angle with respect to the second face.

21. The method of claim 20 wherein the angle is in the range of negative ten to positive ten degrees, such that the slot is not parallel to the second face.

22. The method of claim 20 wherein the angle is in the range of two to four degrees or negative two to negative four degrees.

23. The method of claim 17 wherein the aperture is configured to receive the threading mechanism.

24. A tape cartridge for use with a tape drive having a threading mechanism, the cartridge comprising:
    a magnetic tape;
    a leader attached to an end of the tape and configured to engage the threading mechanism; and
    a cartridge body for housing the tape, the cartridge body including first and second faces disposed at an angle to each other, the first face having a first opening through which the tape may travel, the second face having a second opening for receiving the threading mechanism of the tape drive, wherein the cartridge body further has a slot for stowing the leader in a stowed position, the slot being adjacent to the second face and extending at an angle with respect to the second face.

* * * * *